United States Patent
Park

(10) Patent No.: US 10,118,620 B2
(45) Date of Patent: Nov. 6, 2018

(54) CONTROL METHOD AND SYSTEM FOR CREEP TORQUE OF VEHICLE

(71) Applicants: Hyundai Motor Company, Seoul (KR); Kia Motors Corporation, Seoul (KR)

(72) Inventor: Tae Wook Park, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 457 days.

(21) Appl. No.: 14/561,273

(22) Filed: Dec. 5, 2014

(65) Prior Publication Data

US 2015/0321675 A1 Nov. 12, 2015

(30) Foreign Application Priority Data

May 12, 2014 (KR) .................. 10-2014-0056664

(51) Int. Cl.
*B60W 30/18* (2012.01)
*F16H 61/20* (2006.01)
(Continued)

(52) U.S. Cl.
CPC ...... *B60W 30/18118* (2013.01); *B60W 10/08* (2013.01); *B60W 10/10* (2013.01); *B60W 10/18* (2013.01); *B60W 10/184* (2013.01); *B60W 30/18063* (2013.01); *B60W 30/18109* (2013.01); *F16H 61/20* (2013.01); *B60W 2540/10* (2013.01); *B60W 2540/16* (2013.01); *B60W 2710/083* (2013.01); *B60W 2710/182* (2013.01); *F16H 2061/202* (2013.01)

(58) Field of Classification Search
CPC ............. F16H 2312/06; F16H 61/20; F16H 2061/202; B60W 10/18; B60W 10/184; B60W 30/18063; B60W 30/18109; B60W 30/18118; B60W 2540/10; B60W 2540/16; B60W 2710/083; B60W 2710/182; B60T 7/12; B60T 7/122
See application file for complete search history.

(56) References Cited

U.S. PATENT DOCUMENTS 4,981,202 A * 1/1991 Leigh-Monstevens ...................... B60W 10/06 192/3.56
5,415,467 A * 5/1995 Utz .......................... B60T 7/12 188/265
(Continued)

FOREIGN PATENT DOCUMENTS

CN 102165179 A 8/2011
JP 2006-298064 A 11/2006
(Continued)

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A method of controlling creep torque of a vehicle being provided with an Auto Hold function, includes: a brake detection step for detecting a brake signal of the vehicle; a braking step for activating a brake force and reducing creep torque according to the brake signal; a start detection step for detecting a start signal of the vehicle after the vehicle is stopped; and a starting step for deactivating the brake force and increasing the creep torque according to the start signal.

6 Claims, 3 Drawing Sheets

(51) Int. Cl.
*B60W 10/10* (2012.01)
*B60W 10/18* (2012.01)
*B60W 10/08* (2006.01)
*B60W 10/184* (2012.01)

(56) References Cited

U.S. PATENT DOCUMENTS

| | | | | |
|---|---|---|---|---|
| 5,471,353 | A * | 11/1995 | Codilian | G11B 19/00 318/278 |
| 6,474,186 | B1 * | 11/2002 | Vollmar | F16H 59/0204 74/335 |
| 2010/0292902 | A1 * | 11/2010 | Bach | B60T 8/24 701/70 |
| 2011/0190095 | A1 * | 8/2011 | Bollig | F02N 11/0822 477/203 |
| 2015/0073675 | A1 * | 3/2015 | Malone | B60W 10/06 701/70 |
| 2016/0023660 | A1 * | 1/2016 | Yu | B60T 7/122 477/188 |
| 2016/0121861 | A1 * | 5/2016 | Korte | B60T 7/12 701/70 |

FOREIGN PATENT DOCUMENTS

| | | |
|---|---|---|
| JP | 4281830 B2 | 6/2009 |
| KR | 10-0820489 B1 | 4/2008 |
| KR | 10-2010-0057370 A | 5/2010 |
| KR | 10-1000668 B1 | 12/2010 |
| KR | 10-2013-0009083 A | 1/2013 |
| KR | 10-2013-0060942 A | 6/2013 |

* cited by examiner

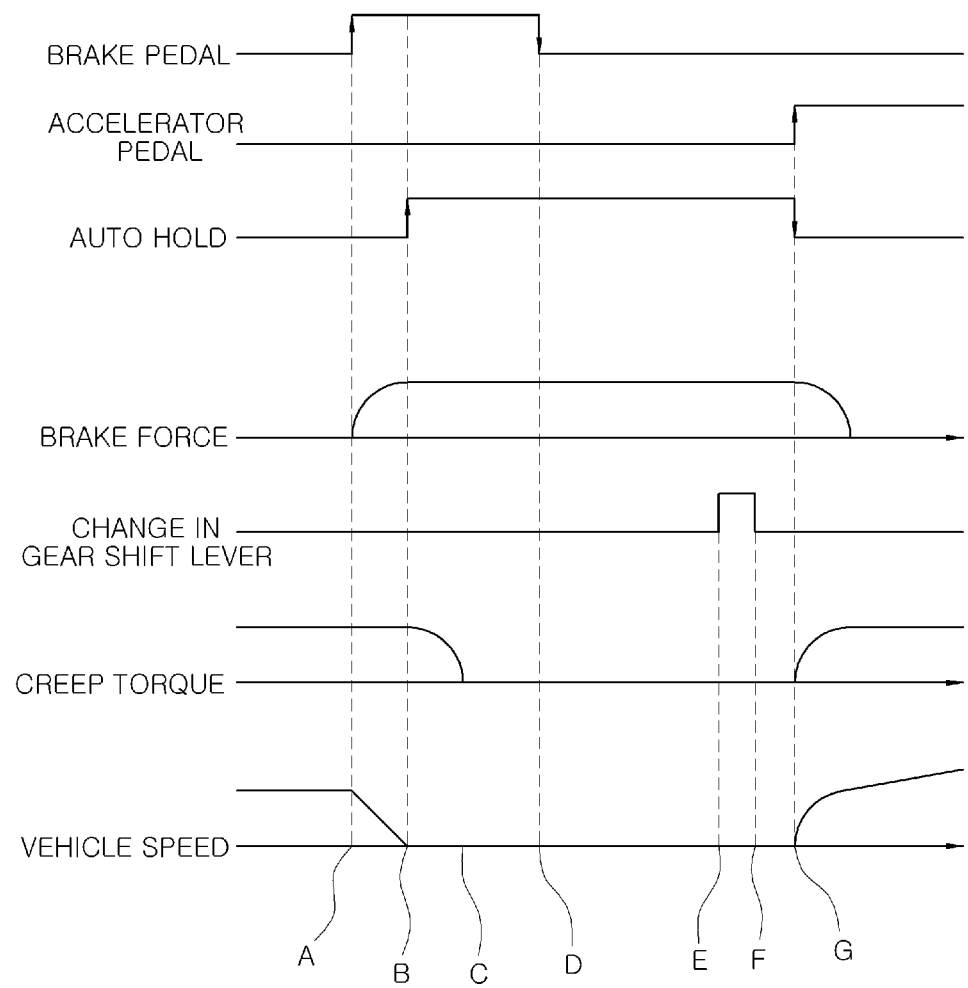

CONTROL METHOD AND SYSTEM FOR CREEP TORQUE OF VEHICLE

CROSS REFERENCE TO RELATED APPLICATION

The present application claims the benefit of and priority to Korean Patent Application No. 10-2014-0056664, filed May 12, 2014, the entire contents of which are incorporated herein for all purposes by reference.

BACKGROUND

Technical Field

The present disclosure relates to a method and a system for controlling creep torque of a vehicle to efficiently reduce brake energy and improve driving quality by preventing unnecessary creep torque in a vehicle provided with an Auto Hold function.

Description of the Related Art

The system structure of hybrid electric vehicles, electric vehicles, and fuel battery vehicles, which do not contain a torque converter, has been applied to conventional internal-combustion vehicles to enhance power transfer efficiency. The hybrid electric vehicles, electric vehicles, and fuel battery vehicles require more precise control of creep torque in order to achieve a basic level of drivability while a vehicle is slowly creeping forward.

Auto Hold, which will be discussed herein, is a convenient automotive feature that has recently been applied to an increasing number of vehicles. First, "creeping" refers, in general, to slow crawling of a vehicle caused by torque transfer resulting from fluid transfer by a torque converter turbine in an automatic transmission. Torque transfer occurs when a driver presses a brake pedal in a vehicle with an automatic transmission with the gear shift in D-position to stop the vehicle, and then takes his/her foot off the brake pedal. Therefore, the driver needs to keep pressing the brake pedal while waiting at a red light or while being stuck in a traffic jam. This may lead to fatigue or to mistakes involving the driver removing his/her foot from the brake pedal, resulting in the vehicle advancing slowly and possibly bumping into a car ahead.

Meanwhile, Auto Hold refers to a function of keeping a vehicle stationary, although the gear shift is in D-position and the driver takes his/her foot off the brake pedal after pressing the brake pedal to stop the vehicle, and then ending the stoppage of the vehicle and allowing the vehicle to move once the driver again presses the accelerator pedal.

The items above described as a related art are only for better understanding of the background of the disclosure and should not be taken as an acknowledgment that they form the related art that would already be known to a person skilled in the art.

SUMMARY

The present disclosure relates to a method of controlling creep torque for hybrid electric, electric and fuel battery vehicles with an Auto Hold function applied. An object of the present disclosure is to efficiently reduce brake energy and improve driving quality by preventing the occurrence of unnecessary creep torque, particularly in a vehicle with an Auto Hold function.

A method of controlling creep torque of a vehicle being provided with an Auto Hold function, includes: a brake detection step for detecting a brake signal of the vehicle; a braking step for activating a brake force and reducing creep torque according to the brake signal; a start detection step for detecting a start signal of the vehicle after the vehicle is stopped; and a starting step for deactivating the brake force and increasing the creep torque according to the start signal.

The method of controlling creep torque of a vehicle may further include a checking step, prior to the brake detection step, for determining when the Auto Hold function of the vehicle is in an active state.

The braking step may be carried out in such a way that, when the brake signal is detected, the brake force may be activated, and, during a period of time after the detection of the brake signal, the creep torque may be reduced.

The braking step may be carried out in such a way that, i) when the brake signal is detected the brake force may be activated, ii) when the vehicle is stopped the Auto Hold function may be activated to reduce the creep torque, and iii) when the brake signal is no longer detected, the brake force may remain activated to reduce the creep torque.

The braking step may be carried out in such a way that, i) when the brake signal is detected the brake force may be activated, ii) when the vehicle is stopped, the Auto Hold function may be activated to reduce the creep torque, and iii) when the brake signal is no longer detected, the brake force may remain activated at a certain level to completely remove the creep torque.

The braking step may be carried out in such a way that, i) when the vehicle is stopped after the brake signal is detected, the Auto Hold function may be activated to maintain the brake force and to reduce the creep torque, ii) when the brake signal is no longer detected, the brake force may remain activated to reduce the creep torque, even when a signal of a change in a position of a gear shift lever is detected during the activation of the Auto Hold function.

The starting step may be carried out in such a way that, when the start signal is detected, the brake force may be deactivated and the creep torque may be increased at the same time.

The method of controlling creep torque of a vehicle, the vehicle being provided with an Auto Hold function, according to the present disclosure may detect a brake signal of the vehicle; activate a brake force, thereby causing a reduction of the creep torque according to the brake signal; detect a start signal of the vehicle while the brake force is activated; and deactivate the brake force, thereby causing an increase the creep torque according to the start signal.

A system for controlling creep torque of a vehicle, the vehicle being provided with an Auto Hold function according to the invention, including: a brake detection unit that detects a brake signal of the vehicle; a start detection unit that detects a start signal of the vehicle; a braking unit that activates a brake force of the vehicle; an activation unit that activates creep torque of the vehicle; and a control unit that: i) detects the brake signal from the brake detection unit, ii) activates the brake force through the braking unit, iii) controls the activation unit to reduce the creep torque while the brake force is activated, iv) detects the start signal of the vehicle from the start detection unit while the brake force is activated, and v) deactivates the brake force of the braking unit, thereby increasing the creep torque through the activation unit.

The control unit may: i) activate the brake force through the braking unit when the brake signal is detected, ii) activate the Auto Hold function to control the activation unit, thereby reducing the creep torque when the vehicle is stopped, and iii) activates the brake force to reduce the creep torque, even when the brake signal is no longer detected.

BRIEF DESCRIPTION OF THE DRAWINGS

FIG. 3 is a diagram for describing how creep torque of a vehicle is controlled according to embodiments of the disclosure.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit, whereby the apparatus is known in the art to be suitable for preventing unnecessary creep torque in a vehicle.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

From here on, embodiments of the disclosure are described with reference to the accompanying figures.

Figure 1:
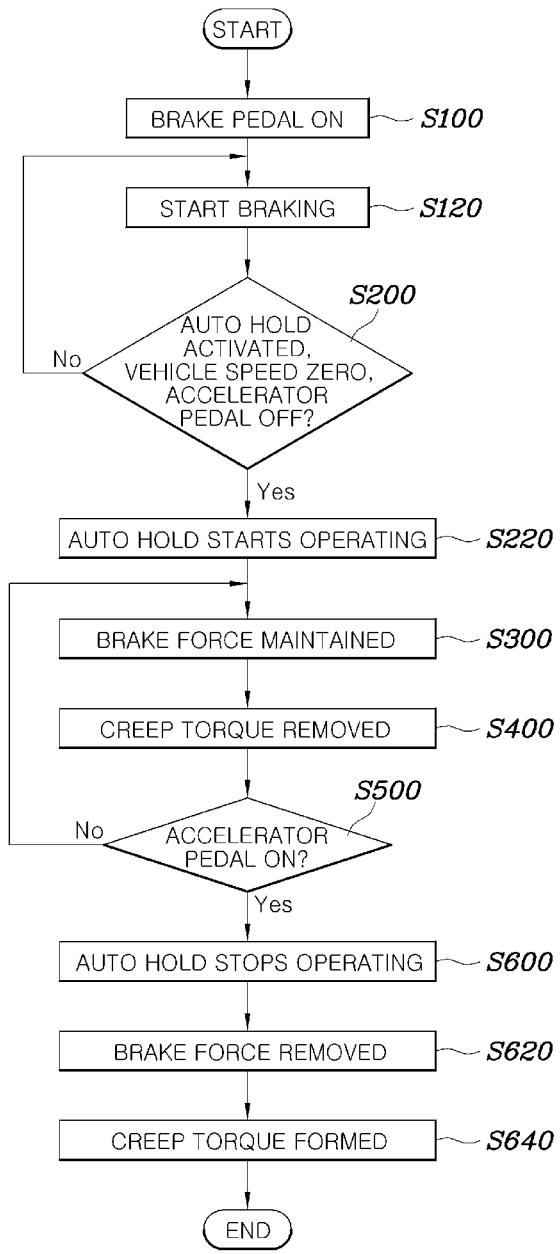
FIG. 1 is a flow chart for a method of controlling creep torque of a vehicle according to embodiments of the disclosure.

FIG. 1 is a flow chart for a method of controlling creep torque of a vehicle according to embodiments of the disclosure. A method of controlling creep torque of a vehicle, the vehicle being provided with an Auto Hold function according to the disclosure, includes: a brake detection step (S100) for detecting a brake signal of the vehicle; a braking step (S300, S400) for activating a brake force and reducing the creep torque according to the brake signal; a start detection (S500) step for detecting a start signal of the vehicle after the vehicle is stopped; and a starting step (S620, S640) for deactivating the brake force and increasing the creep torque according to the start signal. The method of controlling creep torque of a vehicle may further contain a checking step (S200), prior to the brake detection step, for determining if the Auto Hold function of the vehicle is in an active state.

That is, the disclosure relates to a method of controlling creep torque of a vehicle to efficiently reduce brake energy and improve driving quality by preventing the occurrence of unnecessary creep torque in a vehicle, and particularly in a vehicle with an Auto Hold function. The disclosed techniques are highly effective, in particular, when applied to environment-friendly vehicles using a motor as a driving source.

The disclosure intends to reduce the driving speed of a vehicle by activating a brake pressure, so that energy used in unnecessary creep torque is saved and unnecessary excessive maintenance of a brake pressure is prevented. This may be accomplished by reducing creep torque to zero when an Auto Hold function is activated after the vehicle is completely stopped and the driving speed thereof becomes zero, and the brake pressure of the vehicle is maintained to keep the vehicle stationary even if the driver takes his/her foot off the brake pedal.

More specifically, as in FIG. 1, the brake detection step (S100) is performed for detecting the brake signal of the vehicle resulting from a driver's operation of the brake pedal. Then, the braking step (S300, S400) is conducted for activating a brake force and reducing creep torque according to the brake signal.

When the brake signal is detected, the brake force is, of course, activated and the vehicle starts to brake (S120). In particular, for a vehicle with an Auto Hold function, when the feature is manually or automatically activated, the driving speed of the vehicle becomes zero and when the accelerator pedal is not being pressed, the Auto Hold function starts to operate (S200, S220).

Therefore, in the braking step, the brake force is activated and the driving speed is reduced in such a way that the reduction of the driving speed to zero causes the Auto Hold function to operate, which in turn leads to the reduction of the creep torque to zero.

Therefore, the braking step is carried out in such a way that, when the brake signal is detected the brake force is formed (S300), and when the vehicle is stopped, the Auto Hold function is implemented to reduce the creep torque (S400). Even if the brake signal is not detected any more, the brake force may be maintained (S400) and the creep torque may remain removed (S400).

More specifically, the braking step is carried out in such a way that, when the brake signal is detected, the brake force is activated, and when the vehicle is stopped the Auto Hold function is activated to reduce the creep torque. Even if the brake signal is not detected any more, the brake force may be maintained at a certain level and the creep torque may remain completely removed.

Meanwhile, after the vehicle is stopped, the Auto Hold function starts to operate, and the start detection step (S500)

is performed for detecting the start signal of the vehicle. Then, the starting step (S620, S640) is conducted for deactivating the brake force and increasing the creep torque according to the start signal. Therefore, the most distinct characteristic of the disclosure is that creep torque is controlled, not by depending on the signal from the brake pedal as before, but in connection with the start (S220) and end (S600) of the operation of the Auto Hold function while the feature is in operation, thus leading to more efficient energy management and subsequent improvement in driving fuel efficiency.

Meanwhile, the braking step is carried out in such a way that, when the brake signal is detected, the brake force may be activated and, in a certain period of time after the detection of the brake signal, the creep torque can be reduced. That is, whether the Auto Hold function is in operation or not, in a certain period of time after the detection of the brake signal, the creep torque is reduced to allow the vehicle to naturally brake for the operation of the Auto Hold function. In this case, when the Auto Hold function is in operation, the creep torque remains removed, and when the accelerator pedal is pressed, the creep torque is restored to normal.

The braking step is carried out in such a way that, when the vehicle is stopped after the detection of the brake signal, the Auto Hold function is activated to maintain the brake force and keep the creep torque removed, even if the brake signal is not detected any more. The brake force may be maintained and the creep torque may remain removed, even if the signal of a change in the position of a gear shift lever is detected during the implementation of the Auto Hold function.

That is, even if a driver moves the gear shift into various positions, e.g., forward, neutral, and reverse, when the Auto Hold function is implemented, the creep torque is already removed and therefore the shift quality is not affected, which leads to improvement in driving comfort.

Also, in the starting step, unlike the braking step, the detection of the start signal may trigger a deactivation of the brake force and an increase in creep torque at the same time. Thus, the driver may start the vehicle quickly at his/her own will and prevent the vehicle from sliding when starting the vehicle on a sloping road.

In summary, the method of controlling creep torque of a vehicle, the vehicle being provided with an Auto Hold function, according to the disclosure may detect a brake signal; activate a brake force and remove the creep torque while the vehicle is being under the brake force; detect a start signal while the vehicle is being under the brake force; and deactivate the brake force and increase the creep torque again according to the start signal.

Figure 2:
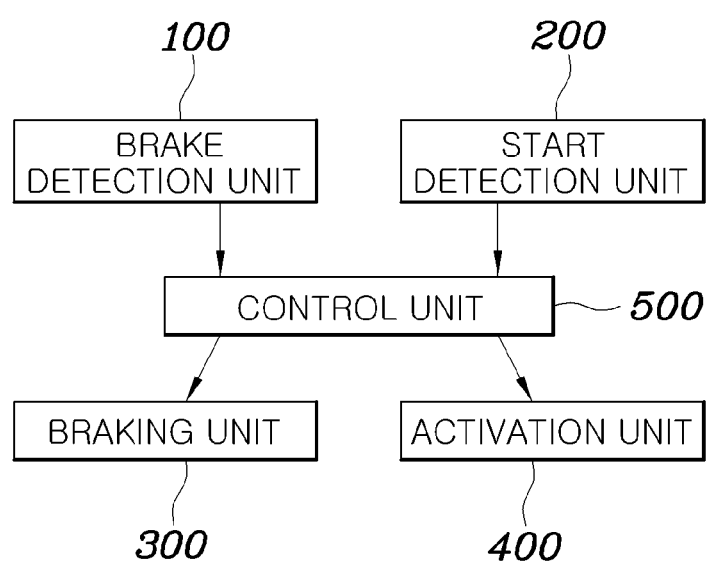
FIG. 2 is a block diagram for a system of controlling creep torque of a vehicle according to embodiments of the disclosure.

Meanwhile, FIG. 2 is a block diagram for a system of controlling creep torque of a vehicle according to embodiments of the disclosure. The system for controlling creep torque of a vehicle, the vehicle being provided with an Auto Hold function, according to the disclosure includes: a brake detection unit 100 for detecting a brake signal of the vehicle; a start detection unit 200 for detecting a start signal of the vehicle; a braking unit 300 for activating a brake force of the vehicle; an activation unit 400 for activating creep torque of the vehicle; and a control unit 500 for i) detecting the brake signal from the brake detection unit, ii) activating the brake force through the braking unit while the vehicle is being under the brake force, iii) controlling the activation unit to reduce the creep torque, iv) detecting the start signal of the vehicle from the start detection unit while the vehicle is being under the brake force, and v) deactivating the brake force of the braking unit, thereby increasing the creep torque again through the activation unit according to the start signal.

The control unit may i) activate the brake force through the braking unit when the brake signal is detected, ii) activate the Auto Hold function to control the activation unit to reduce the creep torque when the vehicle is stopped, and iii) maintain the brake force and keep the creep torque removed even if the brake signal is no longer detected.

FIG. 3 is a diagram for describing how creep torque of a vehicle is controlled according to embodiments of the disclosure, and the disclosure is described in detail with reference to FIG. 3.

When a driver presses a brake pedal while driving (A), the vehicle forms a brake force. If the vehicle does not stop but only slows down, the Auto Hold function does not start to operate and the vehicle is controlled in a conventional manner of brake controlling.

If the vehicle slows down to a halt during the brake process (B), the Auto Hold function starts to operate. Accordingly, the brake force is maintained at a necessary level and the creep torque is removed. The creep torque should be removed within a certain slope range in order to prevent sudden change in conditions or breakdown.

Since the Auto Hold function is implemented even if the driver takes his/her foot off the brake pedal (D), the brake force should be maintained and the creep torque should remain removed. Even if there is a change in gear position on the way (E), the conditions are maintained to prevent a shift shock.

Meanwhile, if the driver presses the accelerator pedal (G), the Auto Hold function stops operating, the brake force is removed and the creep torque is increased to return to the target value.

According to a method and a system for controlling creep torque of a vehicle with a structure described above, when the vehicle is stopped, the formation of unnecessarily excessive brake oil pressure is restricted, and the drive loss of brake hydraulic pump is reduced by limiting unnecessary output of creep torque. The characteristic quietness of environment-friendly vehicles is improved, and the fuel efficiency is enhanced. Also, brake judder is prevented, and a gear-shift shock does not occur. That is, when a vehicle is stopped, the fuel performance, which has deteriorated due to the loss of electric energy resulting from the output of creep torque when the Auto Hold function is in operation, may be improved.

The creep torque decreases to 0 Nm, unlike creep torque consistently output from vehicles equipped with a conventional internal combustion gasoline engine or diesel engine and an automatic transmission. Furthermore, the amount of brake oil pressure for the operation of the Auto Hold function is reduced, in comparison with conventional vehicles, thereby decreasing the loss of electric hydraulic pump.

Moreover, the problem of brake judder caused by the output of creep torque during the operation of the Auto Hold function launched by pressing the brake pedal may be solved, and the gear-shift shock of a stationary vehicle during the operation of the Auto Hold function may be reduced, which leads to improvement in driving quality.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of controlling creep torque of a vehicle, the vehicle being provided with an Auto Hold function, comprising:

detecting a brake signal of the vehicle;
  activating a brake force and reducing creep torque according to the brake signal;
  detecting a start signal of the vehicle after the vehicle is stopped; and
  deactivating the brake force and increasing the creep torque according to the start signal,
  wherein the Auto Hold function is activated to maintain the brake force and to reduce the creep torque when the vehicle is stopped after the brake signal is detected,
  wherein the brake force remains activated to reduce the creep torque when a signal of a change in position of a gear shift lever is detected during activation of the Auto Hold function, and
  wherein, when the start signal is detected, the brake force is deactivated and the creep torque is increased at the same time, such that the brake force gradually decreases to zero and the creep torque gradually increases to a predetermined target value.

2. The method of claim 1, further comprising:
  prior to detecting the start signal, determining whether the Auto Hold function of the vehicle is in an active state.

3. The method of claim 1, wherein when the brake signal is detected, the brake force is activated, and during a period of time after the detection of the brake signal and independently of activation of the Auto Hold function, the creep torque is reduced.

4. The method of claim 1, wherein i) when the brake signal is detected, the brake force is activated, ii) when the vehicle is stopped, the Auto Hold function is activated to reduce the creep torque, and iii) when the brake signal is no longer detected, the brake force remains activated to reduce the creep torque.

5. The method of claim 1, wherein i) when the brake signal is detected, the brake force is activated, ii) when the vehicle is stopped, the Auto Hold function is activated to reduce the creep torque, and iii) when the brake signal no longer detected, the brake force remains activated at a certain level to completely remove the creep torque.

6. A method of controlling creep torque of a vehicle, the vehicle being provided with an Auto Hold function, comprising:

detecting a brake signal;
  activating a brake force, thereby causing a reduction of the creep torque, according to the brake signal;
  detecting a start signal while the brake force is activated; and
  deactivating the brake force, thereby causing an increase of the creep torque, according to the start signal;
  activating the Auto Hold function to maintain the brake force and reduce the creep torque when the vehicle is stopped after the brake signal is detected; and
  maintaining the brake force to reduce the creep torque when a signal of a change in position of a gear shift lever is detected during activation of the Auto Hold function,
  wherein, when the start signal is detected, the brake force is deactivated and the creep torque is increased at the same time, such that the brake force gradually decreases to zero and the creep torque gradually increases to a predetermined target value.

* * * * *